Figure 1:
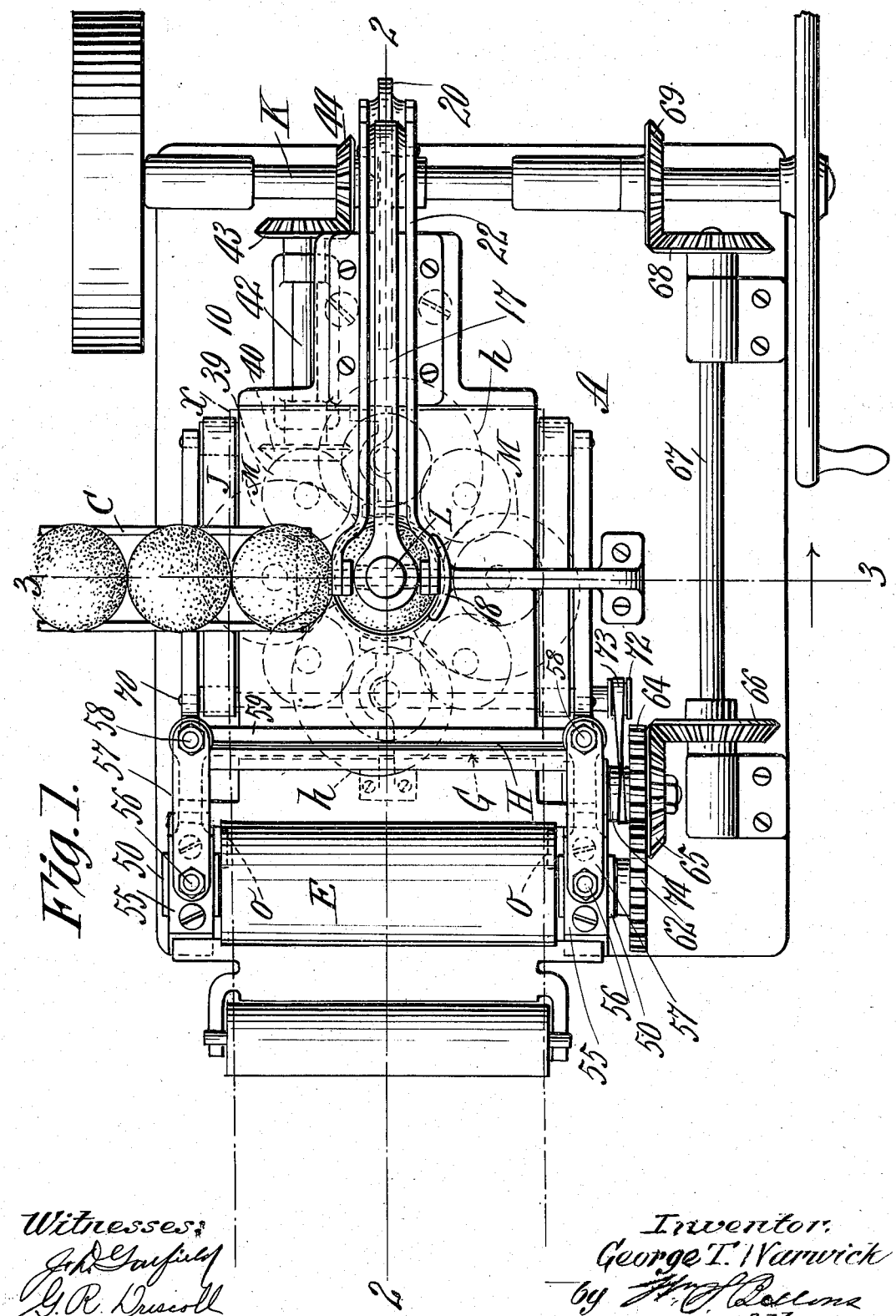

No. 867,176. PATENTED SEPT. 24, 1907.

G. T. WARWICK.

MACHINE FOR WRAPPING ORANGES AND OTHER SPHERICAL OBJECTS.

APPLICATION FILED NOV. 24, 1906.

5 SHEETS—SHEET 1.

Witnesses:
Inventor:
George T. Warwick

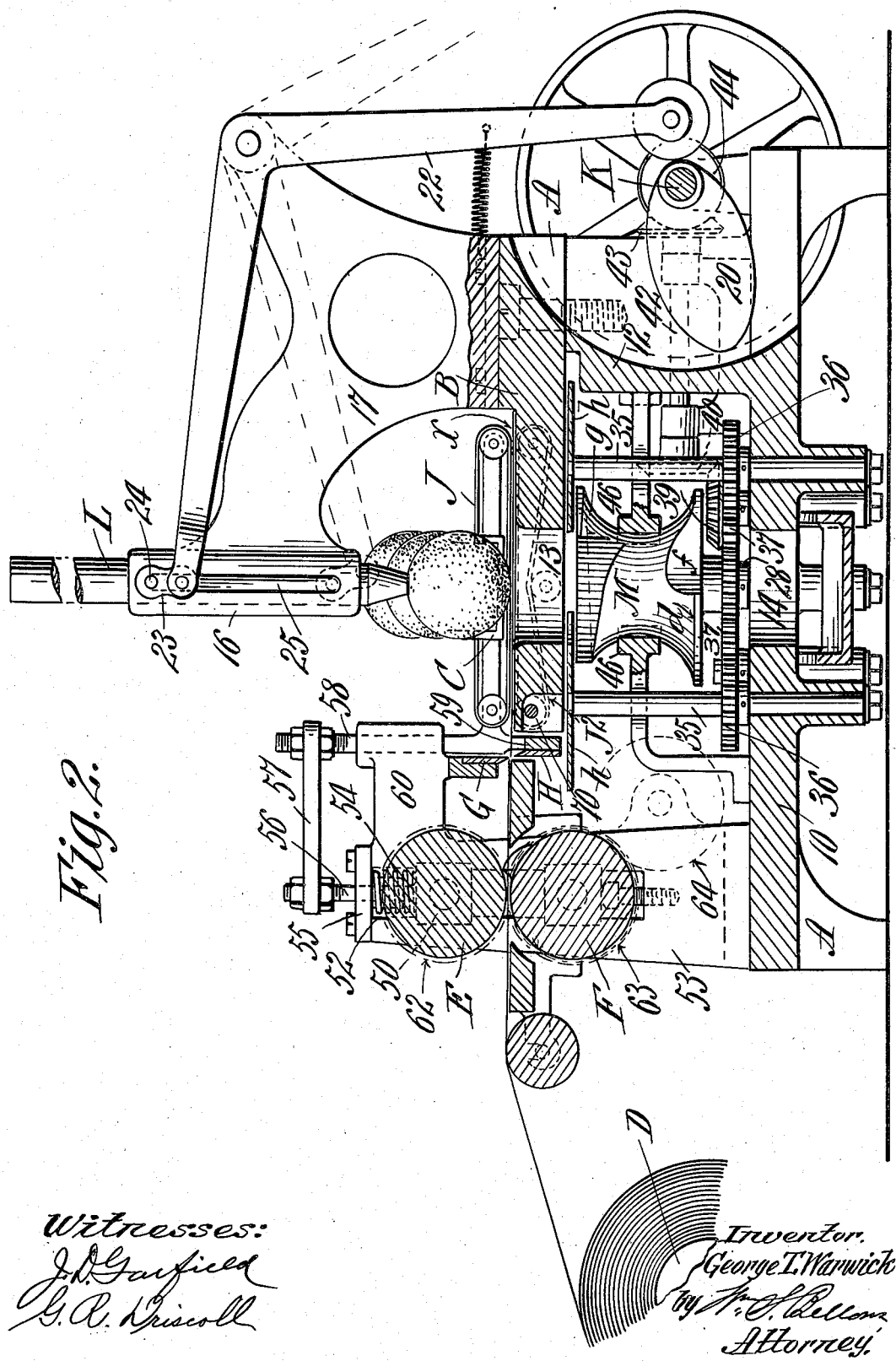

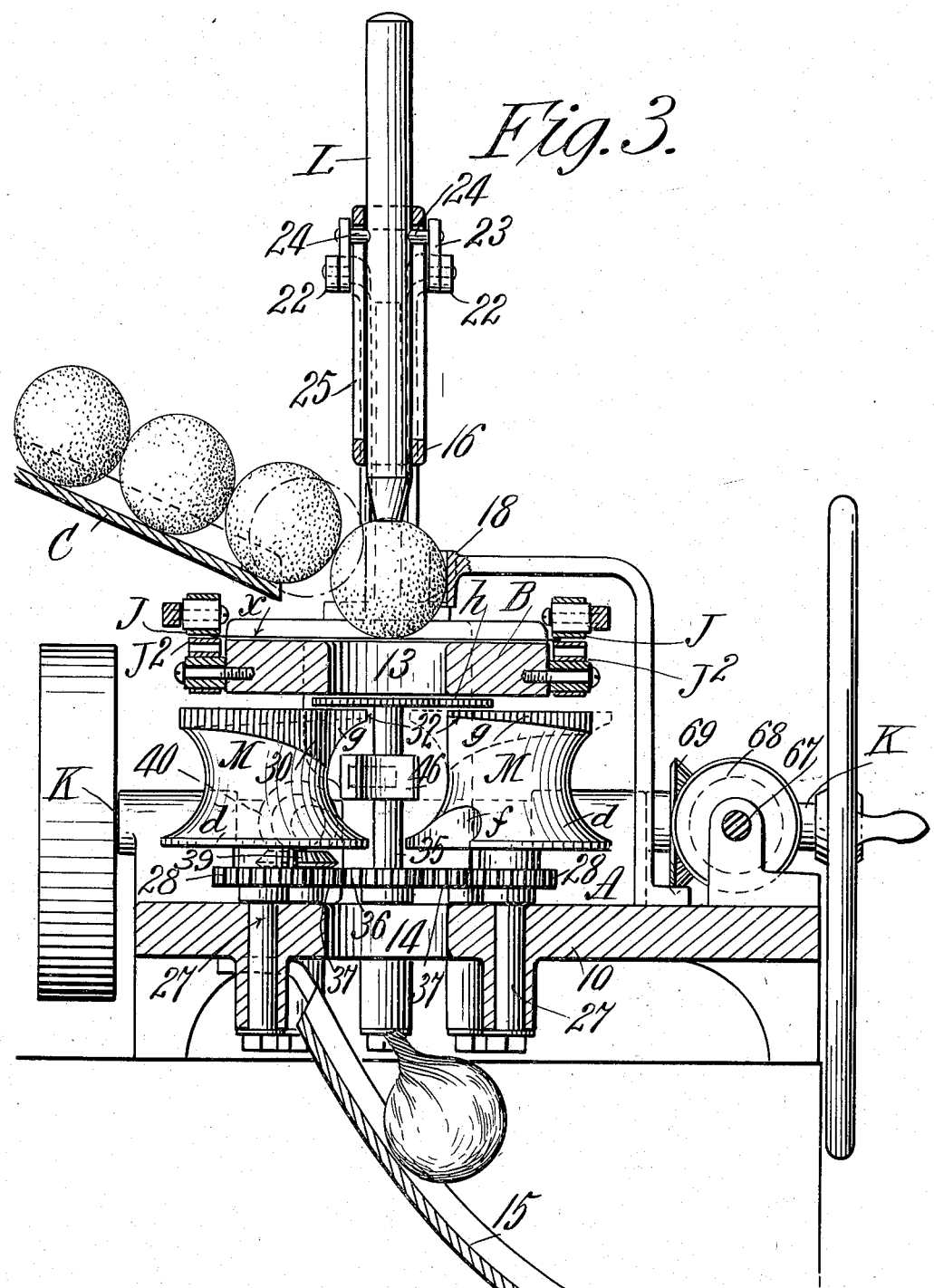

No. 867,176. PATENTED SEPT. 24, 1907.
G. T. WARWICK.
MACHINE FOR WRAPPING ORANGES AND OTHER SPHERICAL OBJECTS.
APPLICATION FILED NOV. 24, 1906.
5 SHEETS—SHEET 4.
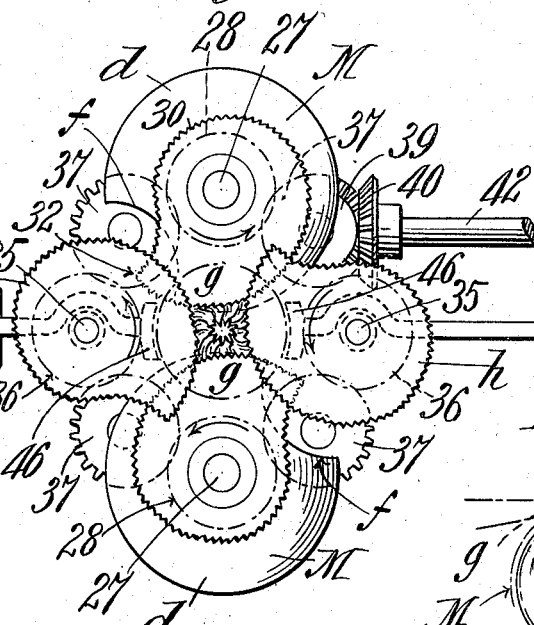
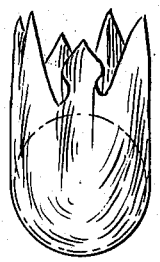
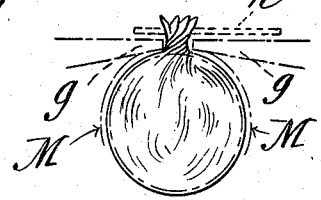
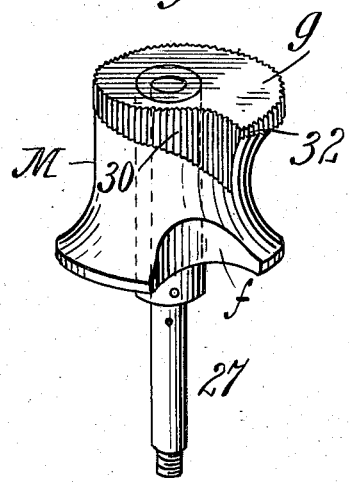
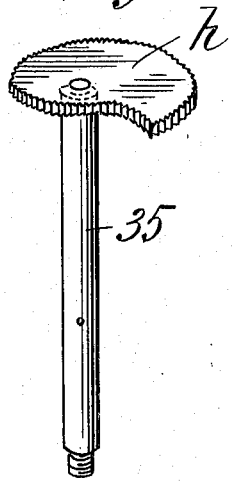
Witnesses:
Inventor,
George T. Warwick.
by
Attorney.

No. 867,176. PATENTED SEPT. 24, 1907.
G. T. WARWICK.
MACHINE FOR WRAPPING ORANGES AND OTHER SPHERICAL OBJECTS.
APPLICATION FILED NOV. 24, 1906.
5 SHEETS—SHEET 5.
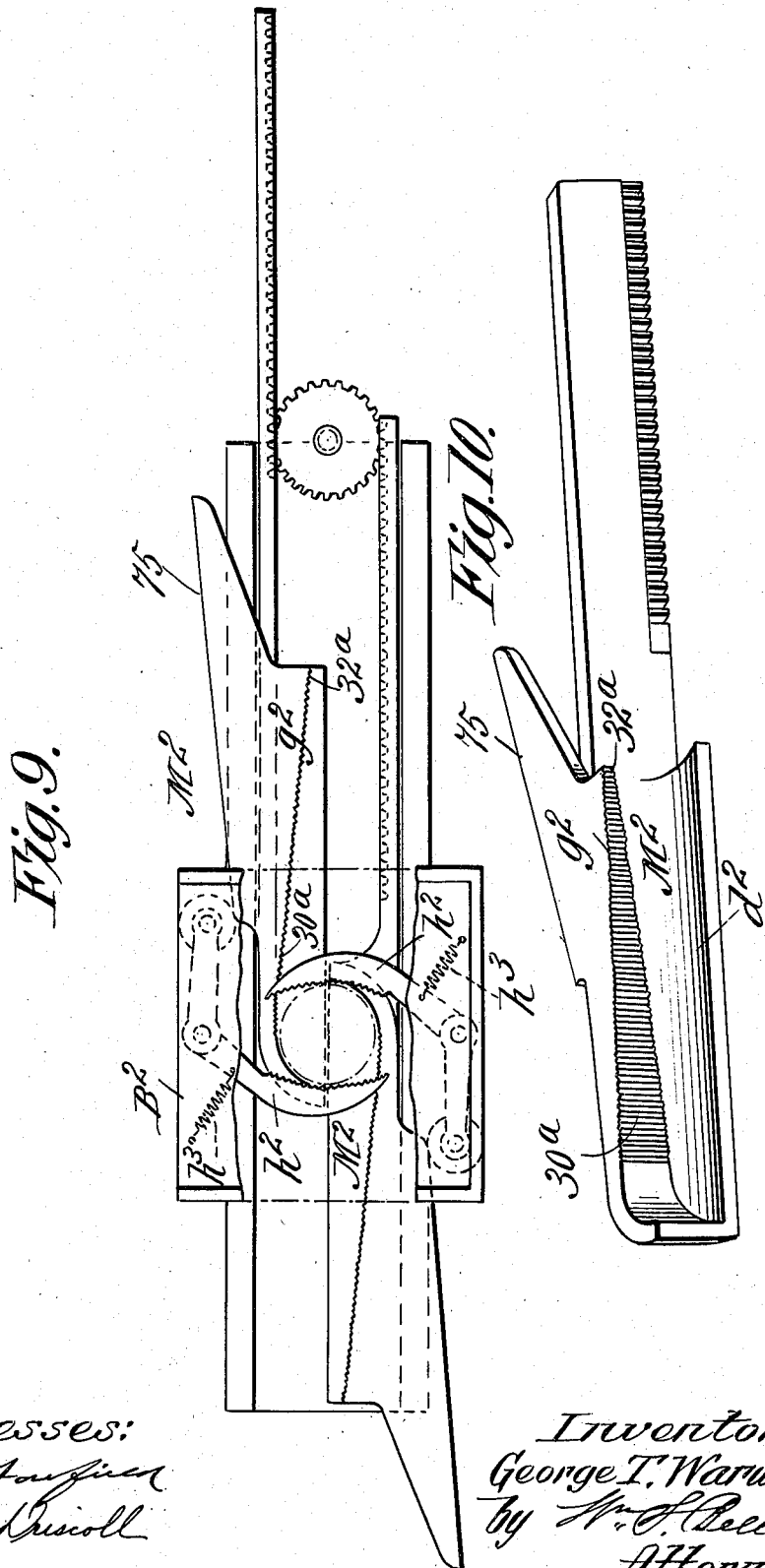

UNITED STATES PATENT OFFICE.

GEORGE T. WARWICK, OF SPRINGFIELD, MASSACHUSETTS.

MACHINE FOR WRAPPING ORANGES AND OTHER SPHERICAL OBJECTS.

No. 867,176.          Specification of Letters Patent.          Patented Sept. 24, 1907.

Application filed November 24, 1906. Serial No. 344,917.

*To all whom it may concern:*

Be it known that I, GEORGE T. WARWICK, a citizen of the United States of America, and a resident of Springfield, in the county of Hampden and State of Massachusetts, have invented certain new and useful Improvements in Machines for Wrapping Oranges and other Spherical Objects, of which the following is a full, clear, and exact description.

This invention relates to improvements in machines for wrapping oranges or other perfectly or approximately spherical objects; and more particularly relates to improvements in a machine comprising, in combination, means for feeding forwardly portions of a paper supply sheet or strip to constitute wrappers, means for conveying oranges onto the wrapper, a mechanism for wrapping the sheet about the orange, twisting the free portions of the wrapper to a sufficiently close and secure condition, and then causing, or permitting the discharge of the wrapped orange, and means for causing the orange with the wrapper suitably relative thereto to be moved from their position of initial assemblage to a position to be subjected to the orange wrapping mechanism.

The object of this invention is to produce a machine having the capabilities above indicated which by reason of the novel formations and combinations of parts thereof is of unusual simplicity, capable of the rapid performance of its required operations, and efficient for the satisfactory wrapping of the spherical articles.
A peculiarity of the present machine is found in the absence from, and lack of necessity in, the wrapping device of any holder or carrier for the oranges, it being discernible from the drawings, accompanying, and the descriptions hereinafter given, that the orange becomes pocketed within, and subject to the action of the orange wrapping devices in such a manner that it and its wrapper partake of rotary movements caused by and in conjunction with the instrumentalities which deflect the marginal portions of the wrapper to be closely twisted.

The invention consists in the combinations and arrangements of parts and devices and the constructions thereof all substantially as hereinafter described and covered in the claims.

In the drawings,—Figure 1 is a plan view of the improved orange wrapping machine; Fig. 2 is a vertical longitudinal sectional view of the same taken on the line 2—2, Fig. 1. Fig. 3 is a transverse vertical sectional view of the machine taken on the line 3—3, Fig. 2. Fig. 4 is a plan view of the orange wrapping mechanism, the location of which is indicated by dotted lines in Fig. 1, and which has its location below the top or apertured table of the machine. Fig. 5 is a perspective view of one of a pair of similar rotatable bodies comprised in the machine of the preferred construction. Fig. 6 is a perspective view of one of a pair of like elements which coact with the rotatable bodies. Figs. 7 and 8 are views illustrating partially and fully wrapped conditions of the paper in relation to the orange as performed at different stages in the operation of this machine. Fig. 9 is a plan view showing important components of an orange wrapping machine embodying principles of this invention, but comprising a modification in that the important components of the orange rotating and wrapping device are organized for rectilinear instead of rotary movements. Fig. 10 is a perspective view showing the form of one of the duplicated parts employed as a modification of the rotary element illustrated in Fig. 5.

Similar characters designate similar parts throughout the drawings.

In the drawings,—A represents the frame or supporting structure of the machine, the same comprising a bed or base portion 10, a table B above and separated from the bed, and the somewhat massive standard 12 rising from the bed and sustaining the table.

The table is made with a circular aperture 13 therethrough, leading towards and terminating adjacent which is an orange guiding chute C.

The orange wrapping mechanism is located below said aperture 13 and between the table and the bed 10; and the latter has an opening 14 for the discharge of the wrapped oranges onto the chute 15, which conveys or guides them away from the machine.

D represents a support for a paper supply, E and F being feed rolls, G and H representing fixed and movable members of a shear, and J and J² represent two, oppositely arranged, pairs of feed belts for engaging slight marginal portions of the strip forward of the shears and for carrying it finally to its position on the table above the aperture 13, as represented in Fig. 2,— *x* representing the cut off portion of the paper to make a wrapper for the orange.

L represents a plunger guided for its vertical movement in the vertically bored head 16 of a goose neck standard 17, the cam actuated means for periodically vertically reciprocating the plunger being so constructed and designed that the plunger will be sufficiently lowered for much of the time of each operating period of the machine so as to constitute a stop in relation to the delivery end of the chute C, whereby the oranges are held back,—the forward one being only permitted to fall off from the end of the chute onto the wrapper on the table coincident with the aperture 13, and to be restrained by the guard 18, in the short interval during which the plunger is in its extreme upward position.

The plunger is operated by the cam 20 on the main shaft K operating against the angular lever 22 pivoted at its elbow on the goose neck standard 16 and having its yoke formed extremity by the link 23 connected to the stud 24 projecting from the plunger and playing in the vertical slot 25 in the guiding head 16.

The orange wrapping mechanism within and subject to the action of which the oranges are successively brought comprise elements in combination, the motions of which may be either continuously rotative, or reciprocatory, the rotary type thereof being preferred, and the same is illustrated in the first four sheets of the drawings and will be next particularly described, while the modification of the wrapping devices involving the same principles but of a reciprocatory type will be latterly briefly mentioned.

M M represent a pair of oppositely located separated rotatable bodies, each having its lower portion $d$ downwardly and outwardly curved to conform to the contour of the orange and having also an edgewise recess $f$. These bodies are fixed and carried on the vertical shafts 27, 27, having bearings in journal holes therefor in the base 10 and having spur gear wheels 28, 28, thereon through means of which these rotatable bodies may be turned concurrently. The said circular rotatable bodies are furthermore constructed with gradually expanding or snail cam shaped upper portions $g$, decreasing in height from their less extended portions 30, Figs. 3 and 5, to their portions 32 of greatest radial extent. The expanding or horizontally widened portion $g$ of each rotatable body is downwardly and inwardly curved or concaved to correspond to the contour of the orange; and the edgewise located surface of each part $g$ is roughened by being serrated, as shown, or otherwise. Each of the rotatable bodies may advantageously be composed of India rubber in any of its elastic compounds, and rendered fast on its shaft or arbor by any suitable attachment means.

35, 35, represent a pair of oppositely located vertical rotatable shafts arranged at either side of a line extended between the pair of shafts 27, 27, the same having spur gear wheels 36 affixed thereon at the same level as the spur gear wheels 28 on the aforementioned shaft 27; and 37, 37, 37, 37, represent intermediate spur gear wheels, intermeshing with the gear wheels 28 on the shafts carrying the rotatable bodies M; and one of the said intermediate gears has on its short shaft, and as one therewith, a bevel gear wheel 39, with which meshes the bevel gear wheel 40 on a shaft 42 in driving connection by the bevel gear wheels 43 and 44 with the main shaft K.

On the upper end of the shafts 35, 35, are plates $h\,h$, revoluble in a plane closely above the upper ends of the rotatable bodies M; and these plates have gradually radially expanding portions, to constitute deflectors for the wrapper and to coact in conjunction with the rotatable bodies M M for the twisting of the upper free portion of the wrapper to the condition represented in Fig. 8. These revoluble deflectors as shown in the drawings are made in the form of, and act as, snail cams, and the motions of the pairs of parts M, M, and $h\,h$, are, as represented by the arrows on Fig. 4. The edges of the said parts $h\,h$ are roughened, as indicated.

46, 46, represent a pair of oppositely located orange guards, the same being separated by a distance slightly greater than the diameter of the graded oranges to be wrapped in the machine and having their locations generally between the rotatable bodies, but somewhat offset to either side of a line between the axes of such bodies. These guards keep the orange centralized in its pocketed relation to and between the rotatable bodies M.

The orange to be wrapped having come to the location represented in Fig. 2 is by the properly timed movement of the plunger forced down with the wrapper, in a shape represented in Fig. 7 between the parts N, receiving support on the lower curved and widening portions $d$ thereof; and the rotating bodies M frictionally engaging the orange at opposite sides of the latter, and the wrapper thereabout, rotate these objects on a vertical axis, and the portions $g$ inwardly gather the wrapper, initially operating by their vertically widest portions 30 on the portion of the wrapper surrounding the upper part of the orange,—the most expanded edge portions 32 laterally acting in the continuation of the inward gathering of the wrapper; and the revoluble deflector plates assuming by their most radially extended portion contracted relations in contact with the inwardly gathering and rotating free upper portions of the wrapper insure the twisting of the latter to the condition represented in Fig. 8, variations of speed between the wrapper and plates $h$, whereby the one has a dragging action relatively to the other conducing to the twisting result. At the proper time when the lower edge recesses $f\,f$ of both bodies M come opposite each other the orange may fall downwardly therethrough, it being designed that the recesses $f\,f$ shall constitute a sufficiently large and free opening as to permit of an immediate and unobstructed orange discharge.

The means for forwardly feeding paper from the supply roll onto the table over the aperture in the latter, and the means for cutting off a leading portion of the paper to constitute a wrapper will be now more particularly described.

The upper feed roll E is journaled in bearing blocks 50 fitted for vertical movements in ways 52 therefor in the standards 53, which are practically portions of the machine frame. Spiral springs 54 located between the standard caps 55 and the tops of the journal blocks 50 operate to hold the blocks in their downward positions and the upper roll E in contact against the lower feed roll F. Each journal bearing block 50 has an upwardly extended post or stem 56 playing through an aperture in the standard cap 55, and carrying a right angularly extending arm 57 supporting a vertical bar 58. The opposite pair of these bars with the horizontal transverse bar 59 constitute a supporting frame for the movable shear blade H; and this frame is suitably guided by having the vertical frame bars 58 fitted through ways therefor in extensions 60 of the standard 53.

The lower feed roll F has cams $o$ at opposite end portions thereof outside of the edge lines of the paper so that at every rotation of the lower feed roll the upper roll will be elevated by the cam, consequently raising the movable shear blade H and severing the paper; and in the short interval of paper severing, the forward progression of the paper is discontinued.

The feed rolls E and F have intermeshing spur gear wheels 62 and 63 made with comparatively long teeth, and with the gear wheels 63 meshes a spur gear wheel 64 on a short hub or stud shaft; and unitary with the said spur gear 64 is a bevel gear wheel 65 in mesh with which is a bevel gear wheel 66 carried by a shaft 67 which has driving connection with the main shaft K through the bevel gear wheels 68 and 69.

The aforementioned pairs of upper and lower belts J and J² are driven by having on the shaft 70 supporting the sheaves for rearwardly located portions of the lower belts J², a pulley 72, around which runs a cross-belt 73 driven by the hub or pulley 74 made as a part of or unitary with the spur and bevel gear wheels 64, 65, driven, as easily seen in Fig. 1, from the driving shaft K.

In Figs. 9 and 10 a modification of the mechanism is indicated in which the oppositely located bodies M², M² are constructed as linear developments of the rotatable bodies above referred to, and illustrated in the preceding views,—these bodies M², M² being arranged for straight reciprocating movements in opposite directions by having the rack bars 76, 76, engaged by a pinion 77, to which suitable motions are to be imparted. Each body M² has a downwardly and outwardly widened curved lower portion d² and an upper expanding portion g², the height of which is decreased from its end portion 30ª to its portion 32ª of greatest transverse horizontal extent. The orange coming down between these bodies will be rotated under the movements in opposite directions of said bodies and the upper free portions of the wrapper will be deflected by the parts g² in precisely the same manner as performed in the previously described rotary wrapping mechanism. The plates h² instead of being rotatable as in the previous described mechanism are pivotally mounted for swinging movements to approach and recede from each other for the twisting effect on the wrapper. The approaching movements of the plates h² are imparted by the impingement of the cams or inclines 75 on the outer upper portions of the straight moving bodies M² against the roller provided arms of the swinging plates, and by the retracting springs h³.

The organization of the wrapping mechanism of the rotary type is preferred because of the greater speed possibilities.

I claim:—

1. In a machine for wrapping spherical objects, a pair of oppositely located and separated bodies and means for imparting movements thereto in opposite directions, such movable bodies having downwardly and outwardly inclined, approached, lower object supporting portions.

2. In a machine for wrapping spherical objects, a pair of oppositely located, separated, bodies, and means for imparting movements thereto in opposite directions, such movable bodies having downwardly and inwardly inclined, approached, lower, body supporting portions, and adapted to receive therebetween and turn the spherical body and the wrapper therefor, and means for inwardly deflecting, to secure the twisting thereof, the upper portion of the wrapper.

3. In a machine for wrapping spherical objects, a pair of oppositely located and separated bodies and means for imparting movements thereto in opposite directions, such movable bodies having downwardly and inwardly inclined approached lower object supporting portions, and having upper portions gradually horizontally widened, to be more closely approached under the movements of such bodies, and operable to inwardly deflect a wrapper relatively to an upper portion of the spherical object to be wrapped.

4. In a machine for wrapping spherical objects, a pair of oppositely located, separated bodies, and means for imparting movements thereto in opposite directions, such movable bodies having downwardly and outwardly inclined, approached, lower, body supporting portions, and having upper members gradually horizontally widened, the surfaces of which are of gradually decreasing height from their portions of less to their portions of greater horizontal extent.

5. In a machine for wrapping spherical objects, a pair of oppositely located, separated bodies, and means for imparting movements thereto in opposite directions, such movable bodies having the surface portions thereof composed of yielding material, and having downwardly and outwardly inclined approached lower object supporting portions.

6. In a machine for wrapping spherical objects, a pair of oppositely located, separated bodies, and means for imparting movements thereto in opposite directions, such movable bodies having downwardly and outwardly inclined, approached, lower, body supporting portions, and having upper portions gradually horizontally widened, the facing surfaces of such widened portions being roughened.

7. In a machine of the character described, a pair of oppositely located, separated, bodies, and means for imparting movements thereto in opposite directions, means for supporting a spherical object to be wrapped between, and to be rotated by, said oppositely movable bodies, and such movable bodies having gradually widening upper portions, and movable wrapper deflectors, the lines of approach thereof being angular to the lines of approach of the widened portions of said movable bodies, and means for operating said deflectors.

8. In a machine of the character described, a pair of oppositely located and separated bodies, and means for imparting movements thereto in opposite directions, such bodies having downwardly and outwardly inclined and approached lower supporting portions for the spherical body to be wrapped, and guards for the object suitably separated and located at opposite sides of the space between said bodies.

9. In a machine for wrapping spherical objects, in combination, a table, having an aperture therethrough, for the support of a wrapper sheet thereon, a pair of oppositely located and separated bodies having downwardly and outwardly inclined, approached, lower portions, said bodies being located below and adjacent the said opening, means for imparting movements to said bodies in opposite directions, and means for forcing the spherical object to be wrapped, with the wrapper therefor, through said opening to a position between,—and so that the object and wrapper will be supported and rotated, by,—said oppositely movable bodies.

10. In a machine for wrapping spherical objects, in combination, a table, having an aperture therethrough, for the support of a wrapper sheet thereon, a pair of oppositely located and separated bodies having downwardly and outwardly inclined, approached, lower portions located below and adjacent the said opening, means for imparting movements to said bodies in opposite directions, means for feeding wrapper sheets onto the table over said opening, and means for forcing the spherical object to be wrapped, with the wrapper therefor, through said opening to a position between,—and so that the object and wrapper will be rotated, by,—said oppositely movable bodies.

11. In a machine for wrapping spherical objects, in combination, a table having an aperture therethrough, for the support of a wrapper sheet thereon, a pair of oppositely located and separated bodies having downwardly and outwardly inclined, approached, lower portions located below and adjacent the said opening, means for imparting movements to said bodies in opposite directions, means for feeding spherical objects to be wrapped to position on said table at the location of and upon the wrapper, above said aperture, and means for forcing the spherical object to be wrapped, with the wrapper therefor, through said opening to a position between,—and so that such object and wrapper will be supported and rotated, by,—said oppositely movable bodies.

12. In a machine for wrapping spherical objects, in combination, a table, having an aperture therethrough, for the support of the wrapper thereon, a pair of oppositely located and separated bodies having positions below located and adjacent the said opening and provided with gradually approaching and outwardly widened upper members, means for imparting movements to said bodies in opposite directions, and means for forcing the spherical object to be wrapped with the sheet through said opening to a position between,—and so that such object and sheet will be rotated by,—said oppositely movable bodies.

13. In a machine for wrapping spherical objects, in combination, a table, having an aperture therethrough, for the support of the wrapper thereon, a pair of oppositely located and separated bodies having positions below and adjacent the said opening and provided with gradually approaching and outwardly widened upper members, the surfaces of which as to height are gradually decreased from their portions of less to their portions of greater inward extent, means for imparting movements to said bodies in opposite directions, and means for forcing the spherical object to be wrapped with the sheet through said opening to position between, and so that such object and sheet will be rotated by, said oppositely movable bodies.

14. An orange wrapping device consisting of a pair of oppositely located separated circular rotatable bodies, each having its lower portion downwardly and outwardly curved, means for rotating said circular bodies, and means for inwardly deflecting the upper portion of a wrapper.

15. An orange wrapping device consisting of a pair of oppositely located separated circular rotatable bodies, having their lower portions downwardly and outwardly curved, and having recesses to assume concurrently adjacent positions, and means for rotating said circular bodies.

16. An orange wrapping device consisting of a pair of oppositely located separated circular rotatable bodies, each having its lower portion downwardly and outwardly curved, and having its upper portion formed gradually expanding radially to constitute a revoluble inwardly deflecting wrapper member, and means for rotating said circular bodies.

17. An orange wrapping device consisting of a pair of oppositely located separated circular rotatable bodies, each having its lower portion downwardly and outwardly curved, and having its upper portion formed gradually expanding radially to constitute a revoluble inwardly deflecting wrapper member, such member having a decreasing height from a less to a more radially distended portion thereof, and means for rotating said circular bodies.

18. An orange wrapping device consisting of a pair of oppositely located rotatable arbors having circular bodies thereon composed of soft rubber, each body having its lower portion downwardly and outwardly curved, and formed with an edgewise opening recess therein, and having an upper gradually widening portion, and means for rotating said arbors in opposite directions.

19. In an orange wrapping device the combination with a pair of oppositely located separated circular rotatable bodies, each having its lower portion downwardly and outwardly curved, and having an edgewise recess, of a pair of elements, revoluble in a plane closely above the tops of said bodies, and having radially expanding wrapper deflecting portions, and means for rotating said bodies in opposite directions, and for rotating said deflector elements.

20. In an orange wrapping device the combination with a pair of oppositely located separated circular rotatable bodies, each having its lower portion downwardly and outwardly curved, and having an edgewise recess, of a pair of elements, revoluble in a plane closely above the tops of said bodies, and having radially expanding wrapper deflecting portions, orange positioning guards at opposite sides of the space between said rotatable bodies and transversely offset from a line between the axes of such bodies, and means for rotating said bodies in opposite directions, and for rotating said deflector elements.

21. In an orange wrapping mechanism, an oppositely located pair of rotatable shafts and a second pair of rotatable shafts arranged at either side of a line extended between said first pair, all of said shafts having spur gear wheels thereon, and intermeshing intermediate spur gear wheels, and means for driving the gear train,—and said first named pair of shafts having circular bodies constructed with downwardly and outwardly curved lower portions having edgewise recesses and constructed with snail cam shaped upper members decreasing in height from their less to their greater radially extended portions, and said second named shafts having at their upper portions snail cam shaped members revoluble in planes adjacent the tops of said circular bodies.

22. In an orange wrapping device the combination with a pair of oppositely located separated circular rotatable bodies, each having its lower portion downwardly and outwardly curved, and having an edgewise recess, of a pair of elements, revoluble in a plane closely above the tops of said bodies, and having radially expanding wrapper deflecting portions, orange positioning guards at opposite sides of the space between said rotatable bodies and transversely offset from a line between the axes of such bodies, means for rotating said bodies in opposite directions, and for rotating said deflector elements, a table located above said rotatable bodies, having an aperture alined with the space between them, means for feeding wrapper sheets onto said table, means for conveying oranges onto the wrapper, and means for successively forcing the oranges and wrappers through said aperture to position between and subject to the actions of the rotatable bodies and revoluble deflectors.

23. In a machine for wrapping spherical objects, adjacent separated bodies having widened object supporting lower portions, means for moving one of said bodies relatively to the other, and both of said bodies having gradually widening upper portions.

24. In a machine for wrapping spherical objects, in combination, a table, having an aperture therethrough, for the support of a wrapper sheet thereon, means for feeding wrapper sheets on said table, a chute terminating above the table adjacent said aperture, an orange stop, above the table opposite the end of the chute, a pair of oppositely located and separated bodies having downwardly and outwardly inclined, approached, lower portions located below and adjacent the said opening, means for imparting movements to said bodies in opposite directions, and means for forcing the orange with the wrapper through said aperture to a position between, and so that the orange and wrapper will be supported and rotated by said oppositely movable bodies.

25. In a machine for wrapping spherical objects, in combination, a table, having an aperture therethrough, for the support of a wrapper sheet thereon, means for feeding wrapper sheets on said table, a chute terminating above the table adjacent said aperture, an orange stop, above the table opposite the end of the chute, a pair of oppositely located and separated bodies having downwardly and outwardly inclined, approached, lower portions located below and adjacent the said opening, means for imparting movements to said bodies in opposite directions, and a vertically reciprocatory plunger movable in line with said aperture, and adjacent and across the end of the chute operable for forcing an orange with its wrapper to a position between said oppositely located movable bodies, and also to serve as a check for oranges in the chute restraining the one behind that being wrapped from unseasonably moving onto the apertured table.

Signed by me at Springfield, Mass., in presence of two subscribing witnesses.

GEORGE T. WARWICK.

Witnesses:
 G. R. DRISCOLL,
 WM. S. BELLOWS.